INVENTOR
BUMON J PRUETT
EUPLE I. PALMER
BY
ATTORNEYS

INVENTOR
BUMON J. PRUETT
EUPLE I. PALMER
BY
Charles C. Wells
ATTORNEYS

INVENTOR
BUMON J. PRUETT
EUPLE I. PALMER

ATTORNEYS

United States Patent Office 3,472,059
Patented Oct. 14, 1969

3,472,059
APPARATUS FOR TESTING A PRESSURE RESPONSIVE INSTRUMENT
Bumon J. Pruett, Walnut Grove, Ala. 35990, and Euple I. Palmer, 4012 McVay St., Huntsville, Ala. 35805
Filed Jan. 19, 1967, Ser. No. 610,723
Int. Cl. G01l 27/00; H01h 35/26
U.S. Cl. 73—4
4 Claims

ABSTRACT OF THE DISCLOSURE

The invention is a pressure balance that employs a pivotally mounted beam. A series of known weights are placed on one end of the beam and the beam is balanced by a piston actuated rod acting on the other end thereof. The pressure in a cylinder in which the piston travels can be calculated by knowing the weight placed on the beam and the piston area. The improved characteristics of this invention results from a control mechanism that monitors the position of the beam and actuates valves to control the pressures exerted against the piston rod and maintain the pivotally mounted beam in a horizontal balanced position. The cylinder pressure is used as a reference to check the accuracy of pressure instruments.

---

The invention described herein was made by employees of the United States Government and may be manufactured and used by or for the Government for governmental purposes without the payment of any royalty thereon or therefor.

The invention relates to pressure balance devices capable of providing a precisely regulated pressure for use in calibrating pressure gauges, etc., to assure their accuracy over a range of pressures. More particularly, this invention is a control system for a pressure balance device employing a pivotally mounted beam which is normally maintained in a balanced horizontal position.

It is common expedient to employ a device capable of delivering a very precise pressure to calibrate pressure responsive instruments to assure their accuracy. One such pressure balance device known to the prior art and described in the patent to A. E. Schuler, U. S. Patent No. 2,992,302, employs a pivotally mounted beam which is maintained in a normally balanced position. In such a pressure balance the beam is maintained in an exactly horizontal position by a piston and cylinder apparatus that exerts a force on one end of the beam sufficient to balance the force exerted on the other end of the beam by known weights placed thereon. The beam is maintained in an exactly horizontal position by a rod extending from a piston and cylinder apparatus. Force is exerted on the piston, and thus the beam, by air or other suitable working fluid supplied from a high pressure supply to a surge tank and then to the piston and cylinder apparatus. The weight applied to the other end of the beam is a known quantity and the cross sectional area of the piston is also known. Therefore, by appropriate calculations, the pressure within the cylinder can be calculated from these known quantities when the beam is balanced. The pressure in the surge tank is identical to that in the cylinder and therefore a pressure gauge connected into the surge tank pressure should read the same as the pressure calculated in the manner described above. A pressure balance such as that described above must also include a control apparatus for assuring that the beam is maintained in a balanced position. Inasmuch as a pressure gauge being tested must normally be tested over a range of pressures provided by either increasing or decreasing the weight mounted on one end of the balanced beam; it is necessary that the control apparatus be capable of rapidly and accurately rebalancing the beam.

In a pressure balance such as the one disclosed in the Schuler patent identified above, it is common for the balance beam to be overcontrolled. As an example, when additional weight is applied to one end of the beam and the piston rod exerts a force on the other end of the beam, the beam often swings past its balanced position due to the inertia of the beam. This movement of the beam will be picked up by the control system and interpreted as a change in weight rather than an overcontrol. When this happens a change will be made which will reduce the force applied to the beam by the piston rod and permit the beam to swing back through to an unbalanced position in the other direction opposite from the overcontrol. It is believed readily apparent how this could continue for several cycles and thus greatly increase the time required to come up with a stabilized pressure in the apparatus balancing the beam, which pressure is that used as a reference for calibrating pressure instruments. Another factor to be considered in providing a suitable control system for a pressure balance is the effects of frictional heating due to the passage of pressurized fluid through various conduits and metered orifices. For example, in pressurizing the system air is admitted to the cylinder through a metered orifice and the air flowing through this orifice will become heated due to the friction. When the flow of air into the cylinder ceases, the air will immediately begin to cool, reducing the pressure in the cylinder. This pressure drop due to cooling causes the beam to become unbalanced and the pressure must be raised in the cylinder to exert additional force on the beam. It can be seen that a sufficient initial pressure in the cylinder to provide adequate pressure after cooling could result in an over control that would be detected by the control system as an overbalanced beam.

A pressure balance constructed in accordance with this invention compensates for the disadvantages mentioned above and provides a pressure balance capable of delivering a series of pressure values very rapidly. This is accomplished by utilizing a precise control system for detecting any deflection of the balanced beam away from a balanced position and then either rapidly or slowly, depending on the magnitude of the beam deflection, increasing or decreasing the force applied to said beam so as to bring the beam back to a balanced position. A time delay is incorporated into the control system that eliminates many of the small corrections indicated by the control system as necessary that are due to inertia effects of the beam and frictional heating of the working fluid in the system.

It is therefore an object of this invention to provide a pressure balance for use in calibrating a pressure responsive instrument that is capable of delivering a regulated pressure output.

Another object of this invention is to provide a pressure balance capable of delivering an output pressure which varies over a range of pressures in predetermined increments and where the transition from one pressure level to another over the entire range is very rapid and accurate.

Other objects and advantages of the present invention will become more apparent when considering the following detailed description in conjunction with the accompanying drawings wherein:

FIGURE 7 is a graphical illustration of how the invention can rapidly provide a series of calibration pressures due to improved control.

Figure 1:
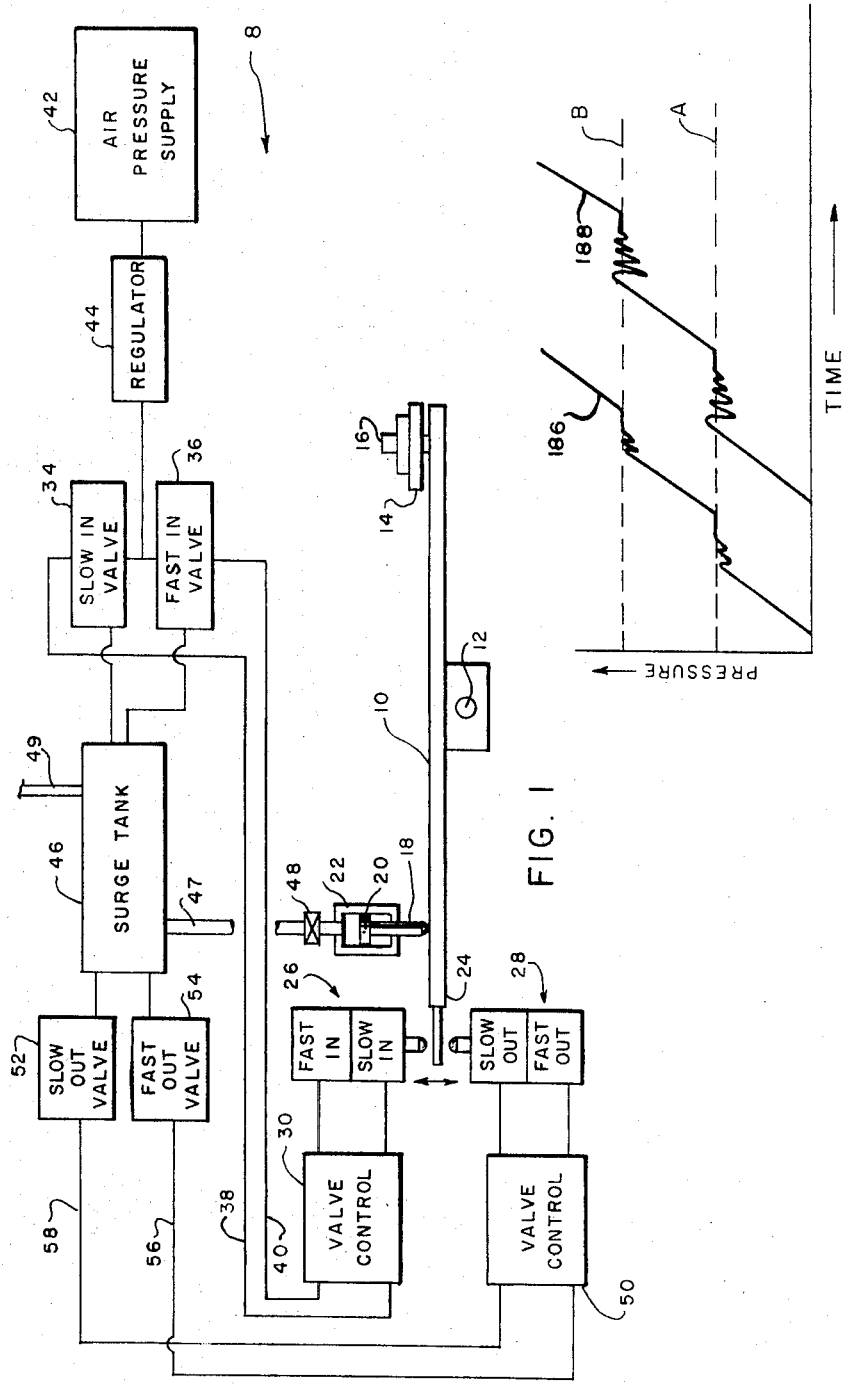
FIGURE 1 is a schematic illustration of a pressure balance arranged in accordance with the present invention.
Figure 3:
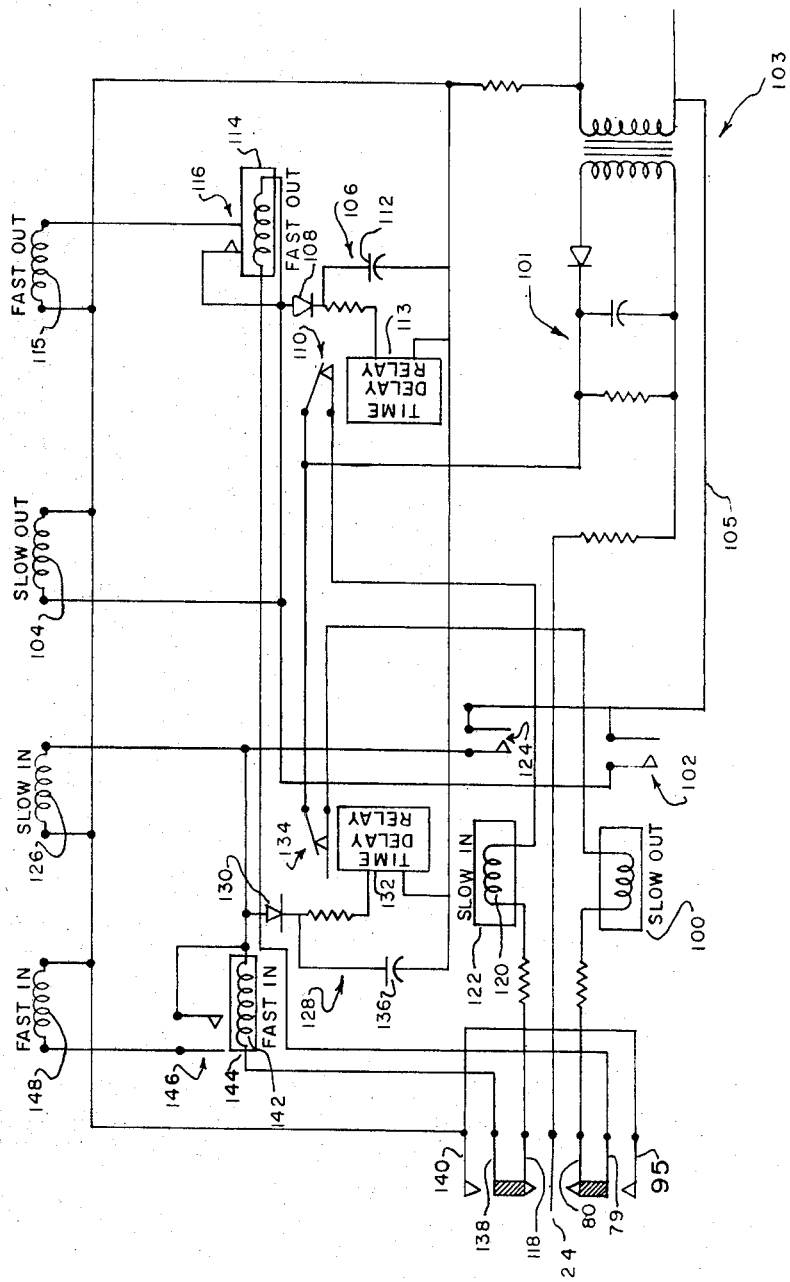
FIGURE 3 is a circuit diagram of the control system employed in the invention.

Referring to FIGURE 1 of the drawings, a pressure balance 8 is schematically illustrated that includes a beam 10 pivotally mounted or supported upon a base (not shown) by a pivot connection 12. Beam 10 has a platform 14 mounted on one end thereof which provides a pedestal upon which weights 16 of varying values can be placed. A rod 18 extends from a piston 20 slidably disposed in a cylinder 22. Rod 18 engages end 24 of pivotally mounted beam 10 and normally exerts a force thereon sufficient to balance weights 16. End 24 of beam 10 is positioned between a pair of switch mechanisms 26 and 28 so that pivotal movements of the beam will result in actuation of one of the switch mechanisms. Switch mechanism 26 consists of Slow In and Fast In control contacts connected through a valve control means 30 into Slow and Fast In solenoid valves 34 and 36 via lines 38 and 40. The valve control means include various relays, a transformer, and two time delay circuits which are schematically illustrated in FIGURE 3 and more fully discussed hereafter. The Fast and Slow In valves admit air from a high pressure source 42 and regulator 44 into surge tank 46. The surge tank is in direct communication with cylinder 22 through conduit 47 and a normally opened valve 48. Also, the surge tank is connected to the instrument being calibrated (not shown) via a line 49.

Switch mechanism 28 is very similar in structure and operation to switch mechanism 26 except that it functions to vent pressure from the surge tank and thus reduce the pressure within cylinder 22 and reduce the force applied to beam 10. Switch mechanism 28 is connected through a suitable valve control means 50 into Slow and Fast Out valves 52 and 54, via lines 56 and 58 which vent surge tank 46 to the atmosphere.

As mentioned above, surge tank 46 is in direct communication with cylinder 22 through normally open valve 48. Thus, the pressure within the surge tank is the same as that within the cylinder and a pressure gauge connected into the surge tank pressure via line 49 should indicate a pressure which agrees with a calculated pressure for cylinder 22. It is a relatively simple matter to calculate the pressure within the surge tank since the weight 16 applied to platform 14 is a known quantity and the cross sectional area of piston 20 is also known. Thus by appropriate calculations the pressure within the cylinder can be calculated, which calculated pressure should agree with the pressure reading of the gauge being tested if the pressure gauge is accurate.

Figure 2:
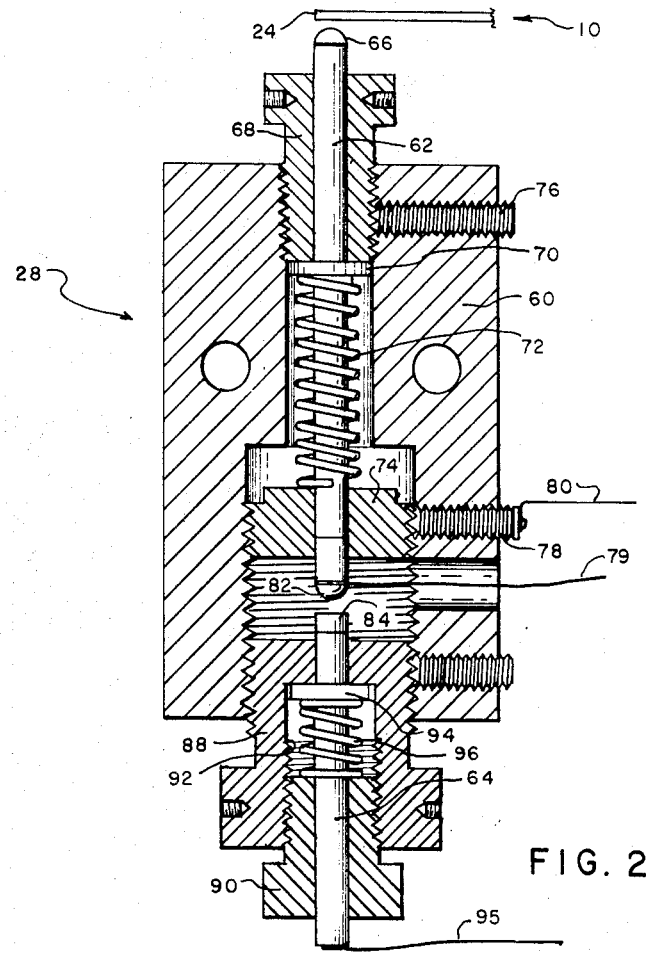
FIGURE 2 is a view, partially in section, illustrating a switch mechanism employed to monitor the position of the pivotally mounted beam.

Referring now to FIGURE 2 of the drawing where switch mechanism 28 is illustrated. Since switch mechanism 26 and 28 are identical, a description of one will suffice for both. Switch mechanism 28 includes an outer housing 60 in which contact plungers 62 and 64 are slidably mounted by means of suitable collar and bushing means, discussed hereafter. End 66 of contact plunger 62 is contacted by end 24 of beam 10 when the beam becomes overbalanced in a counter-clockwise direction. Contact plunger 62 is held in position by a collar 68 that is threaded into the top of housing 60. Flanged portion 70 of contact plunger 62 abuts one end of collar 68 to limit the upward travel of plunger 62 and also serves as a surface against which spring 72 encircling the contact plunger can react to bias the contact plunger in an upwardly direction. Spring 72 is retained in a position about the contact plunger by means of a retainer collar 74 threadably mounted to an interior surface of housing 60. It is readily apparent from considering the switch mechanism that the biasing force of spring 72 is controlled by the vertical position of retainer 74. Collar 68 is locked into position by a setscrew 76 which threads into housing 60 and jams collar 68. Likewise, retainer 74 is locked into position by a similar setscrew 78, however; setscrew 78 also functions as an electrical contact to which a lead 80 is attached by suitable means such as soldering. End 82 of contact plunger 62 extends below retainer 74 in a position where it can engage upper end 84 of lower contact plunger 64 and end 82 also has an electrical lead 79 connected theerto. Contact plunger 64 is held in position by a retainer nut 88 threaded into housing 60 and a second retainer nut 90 threaded into recess 92 in retainer nut 88. Contact plunger 64 has a flanged portion 94 formed thereon which limits upward movement of plunger 64 by bottoming in recess 92. Spring 96 positioned around contact plunger 64 reacts against flange 94 and retainer nut 90 to bias contact plunger 64 in an upward direction. Again, it is readily apparent that the clearance between ends 82 and 84 of the contact plungers is controlled by the positioning of retainer nut 88 and the biasing force spring 96 exerts on plunger 64 is determined by the position of retainer nut 90 within retaining collar 88. An electrical lead 95 is attached to the lower end of contact plunger 64.

The operation of the switch mechanism is as follows: When beam 10 of the pressure balance is sufficiently rotated about its pivot point in a counter-clockwise direction, end 24 of the beam will engage end 66 of the contact plunger. If the engagement is slight it results in only a small pressure being applied to plunger 62 and the plunger will not be depressed enough to engage end 84 of contact plunger 64. In this instance a circuit will be completed which consists of beam 10, contact plunger 62 and lead line 80 in electrical contact with plunger 62. If the engagement of beam 10 with plunger 62 causes end 82 of plunger 62 to engage end 84 of plunger 64 then the circuit described above will be completed and also a circuit will be completed consisting of lead 79, contact plunger 64, and lead 95. The significance of the two circuits will be more fully appreciated when FIGURE 3 is discussed. Suffice it to say presently that completion of the first circuit actuates the Slow Out valve to slowly vent the surge tank whereas completion of both the first and second circuit will actuate both the Fast Out valve and the Slow Out valve. When the pressure in the surge tank is vented and the force exerted on contact plunger 62 by beam 10 is lessened, the plunger will be biased upwardly by spring 72 and break contact with contact plunger 64, thus, opening the circuit which closes the Fast Out valve. As the surge tank continues to vent through the Slow Out valve, the force exerted on end 24 of beam 10 will continue to decrease until beam 10 swings out of contact with contact plunger 62. When this occurs of course the circuit actuating the Slow Out valve will be broken and venting of the surge tanks will cease.

Switch mechanism 26 is identical to switch mechanism 28 just described except that when actuated this switch mechanism functions to admit pressure to the surge tank via the Fast In and Slow In valves which are connected to a supply of pressurized air through pressure regulator 44.

Referring now to FIGURE 3 of the drawing is an electrical schematic for the invention, the schematic will be described by discussing the sequence of operation that occurs after a weight has been removed from beam 10 and the beam is unbalanced in a counter-clockwise direction due to the action of piston rod 18 on end 24 of the beam. This pushes the beam against contact plunger 62 which connects lead 80 to beam 10 and thus completes a circuit which energizes Slow Out relay 100 to close normally open contact points 102. It should be understood that relay 100 is shown only schematically and that it includes a coil (shown) surrounding an iron core (not shown) to form an electromagnet, and normally open contact points 102. Contact points 102 would include a spring (not shown) or spring action that would normally bias the points to an open position. However, when the coil of relay 100 is energized the core (not shown) becomes a magnet that generates sufficient magnetic force to overcome the spring force normally opening the contact points and thus close the contact points. This is the normal mode of operation of simple relays and such relays are available with either normally open or normally closed contacts. Closing of contact points 102 energizes a Slow Out solenoid 104 which in turn activates Slow Out valve 52 to vent the surge tank. It will be noted that one side of contact points 102 are connected to the 110 volts AC side of isolation transformer 103 through line 105 and the other side of contact points 102 is connected to the other side of the 110 volt AC source through Slow Out valve 104 and also through a time delay circuit 106 via diode 108. When the time delay circuit 106 is energized the normally closed contacts 110 are opened and capacitor 112 is charged. When the time delay circuit is de-energized, the capacitor discharges across time delay relay 113 to hold contact points 110 open for a suitable time period of, for example, three seconds. Controls to admit air to the surge tank and cylinder cannot be actuated during this time period of three seconds. The reason for this time delay will be more clearly apparent when the Slow In portion of the circuit is described.

Further rotation of beam 10 in a counter-clockwise direction will result in contact plunger 62 being depressed sufficiently to engage contact plunger 64 thereby completing a second circuit by connecting electrical lead 79 to lead 94. When this occurs a Fast Out relay 114 is energized to close contact points 116 and energize Fast Out solenoid 115 which in turn opens Fast Out valve 54 to rapidly vent surge tank 46. As the pressure within the surge tank is decreased, the amount of force applied to the beam by piston rod 18 is reduced and thus the beam can rotate in a clockwise direction to permit contact plunger 62 to become disengaged from contact plunger 64 and thereby de-energize the Fast Out portion of the system. Further venting of the surge tank will result in the beam 10 becoming disengaged from contact plunger 62 and the entire venting portion of the system will become inactive. Should beam 10 pivot in a clockwise direction a sufficient amount to engage the Slow In switch mechanism, either because of an added weight applied to one end of the pivot beam, or due to inertia of the beam as it swings up to a balanced position, a circuit will be closed by connecting end 24 of beam 10 to leadline 118. This will, assuming contact points 110 are closed, energize coil 120 in Slow In relay 122, to close normally opened contacts 124. It will be noted that coil 120 is connected to the 110 volts provided by a half wave rectifying circuit 101 connected to one side of transformer 103 through contact points 110 of the time delay circuit. Thus coil 120 cannot be energized nor contact points 124 closed when contact points 110 are open. Contact points 110 are normally closed except when the time delay relay 113 is actuated as occurs when the Slow or Fast Out relays are actuated or during the time delay period when capacitor 112 is discharging through the time delay relay after circuit 106 has been de-energized. The circuit 106 is de-energized when the Slow and Fast Out relays are de-energized due to clockwise movement of the pivotally mounted beam. Thus, the Slow In relay cannot be energized and contact points 124 closed for a period of, for example, three seconds after the venting or Out portion of the system has been de-energized and therefore a time delay is introduced that permits system conditions like air temperature and spring forces to stabilize so as to prevent over controlling of the beam.

The closing of contact points 124 completes a circuit to connect Slow In solenoid 126 to the 110 volt AC power supply. Closing of the contact points 124 also causes time delay circuit 128 to be energized via diode 130. Actuation of the time delay circuit results in the time delay relay 132 being energized to open normally closed contact points 134. In addition, capacitor 136 is charged so that when the time delay circuit is de-energized it will discharge across time delay relay 132 to hold contact points 134 open for a period of, for example, three seconds. It will be noted that the coil of the Slow Out relay is connected to the 110 volts DC through contact points 134. Thus, when contact points 134 are open the Slow Out relay cannot be energized.

Further clockwise rotation of the pivotally mounted beam will result in lead 138 being connected to lead 140 to complete a circuit which results in coil 142 of Fast In relay 144 being energized to close contact points 146 and thus energize Fast In solenoid 148 which will in turn actuate Fast In valve 36 and result in a rapid increase in the pressure in surge tank 46. This pressure increase will be communicated to the interior of cylinder 22 and result in piston rod 18 exerting additional force on the beam 10 to overcome the rotational effects of any weight placed thereon. Every component and leadline of the circuit shown in FIGURE 3 has not been labeled, but the circuit has been described in sufficient detail, it is believed, to permit an understanding thereof.

Figure 4:
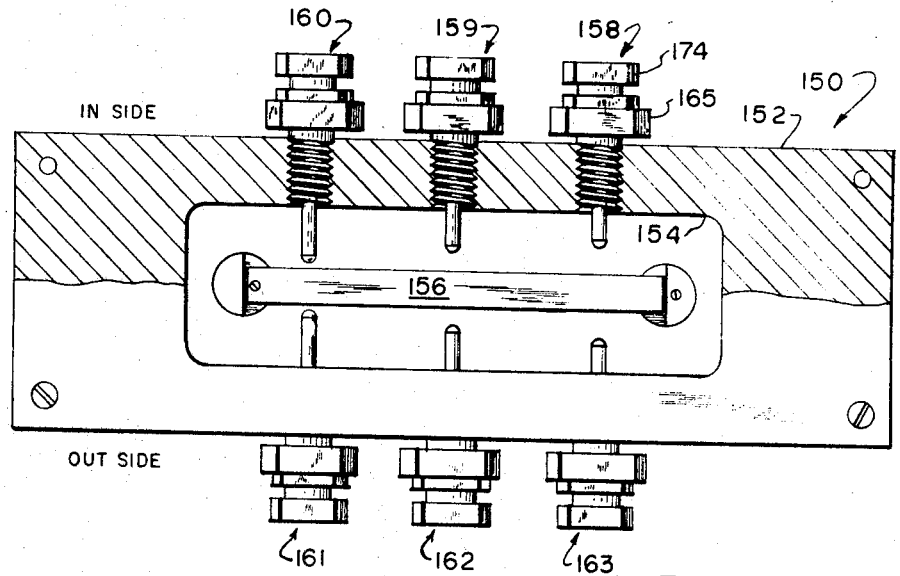
FIGURE 4 is a view in cross section illustrating an alternate embodiment of a switch mechanism which can be employed to monitor the position of a pivotally mounted beam.
Figure 5:
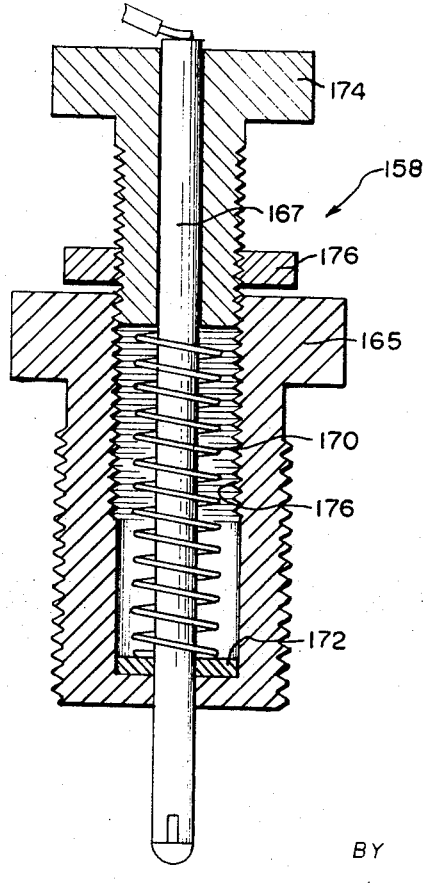
FIGURE 5 is a cross sectional view of a contact element employed in the switch mechanism illustrated in FIGURE 4.

Referring now to FIGURES 4 and 5 of the drawings there is shown an alternate embodiment of a switch mechanism that detects an unbalanced condition of a pivotally mounted beam and completes control circuits that actuate various components of a system to rebalance the beam. Switch mechanism 150 is different in structure, but similar in function to the switch mechanism 28 discussed heretofore. However, switch mechanism 100 is somewhat more elaborate in that it makes possible fast, intermediate and slow control rather than only fast and slow control as did switch mechanism 28. The switch mechanism includes a housing 102 having a central aperture 154 formed therein which accommodates one end of a pivotally mounted beam 156. Housing 152 has a plurality of switches 158 through 163 mounted therein which are actuated by movement of beam 156. Each of the switch mechanisms are identical in structure, but they are calibrated differently depending upon whether or not they are used to actuate the slow, intermediate or fast portion of the control circuit to which they are connected. Since the switch mechanisms are substantially identical only one will be described in detail. Switch 158, for example, includes (see FIGURE 5) a housing 165 having a contact plunger 167 slidably disposed therein. Downward movement of contact plunger 167 is limited by flange 169 formed thereon and the plunger is biased downwardly by coil spring 170 encircling the contact plunger. The contact plunger is retained within housing 165 by spring 170 acting on flange 172 and a retainer cap 174 threaded into bore 176 of housing 165. It is believed readily apparent from a consideration of FIGURE 5 that the preload on spring 170 can be adjusted by vertical movement of retainer cap 174. The retainer cap is locked into position by locknut 176.

Referring again to FIGURE 4, it can be seen that the lower ends of the contact plungers 167 are spaced from the surface of beam 156 an increasing amount from left to right. This is necessary since opposed switch mechanisms 160 and 161 actuate Slow In and Out valves whereas switch mechanisms 159 and 162 actuate Intermediate In and Out valves and switch mechanisms 158 and 163 actuate Fast In and Out valves. The spacing of the ends of contact plungers 167 from the beam has been considerably exaggerated in FIGURE 4 for purposes of clarity. In actual practice the spacing variation would be very slight and proper operation of the various switching mechanisms would be accomplished not only by spacing of the contact plunger from the beam, but by fine adjustment of the preload on spring 170.

The operation of this switch mechanism, which is believed readily apparent, is as follows: assuming that a weight has been applied to the beam so as to cause end 156 of the beam to be pivoted in an upward direction as viewed in FIGURE 4. The beam would first engage the contact plunger of switch mechanism 160 to actuate the Slow In portion of a system so as to increase the force applied to beam 156 by the piston rod. If the weight applied to beam 156 is sufficient, the upward deflection of the beam will be great enough to actuate both switches 159 and 158. As the piston rod exerts an increasing force on the beam due to increased pressure within the piston and cylider apparatus, the beam will become disengaged from contact plungers 167 of switch mechanisms 158, 159 and 160 in order as the beam approaches a balanced position.

Figure 6:
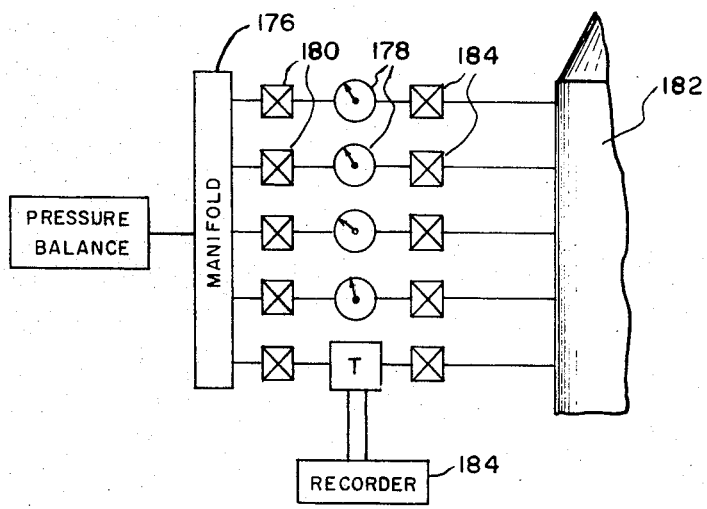
FIGURE 6 is a schematic showing of a pressure balance constructed in accordance with this invention connected into a plurality of pressure gauges which are employed to monitor pressures in a space vehicle.

Referring now to FIGURES 6 and 7 of the drawing, a particular application of the invention will be discussed along with the advantageous mode of operation made possible by the rapid and precise control of the pivotally mounted beam. In FIGURE 6 a pressure balance is connected into a manifold 176 to provide a desired pressure level therein. The manifold is connected to a series of pressure instruments 178 through valves 180. The pressure instruments are in turn connected to a launch or space vehicle 182 undergoing, for example, fabrication and test on a static test stand. Valves 184 are normally positioned between each one of the pressure instruments 178 and a component being monitored within space vehicle 182. A launch vehicle has a large number of pressure responsive or actuated components and it is necessary to continually monitor these components during fabrication and test of the vehicle. Likewise it is necessary to frequently check the pressure instruments used to monitor these components to assure their accuracy. If the instruments 178 are being used to monitor components within the space vehicle, valves 180 are closed and valves 184 are opened. When it is desired to test the instruments valves 184 are closed and valves 180 are opened to admit pressure from manifold 176 to the instruments. The pressure within the manifold is regulated over a range of pressures in a manner discussed heretofore and this range of pressures is communicated to the pressure instruments via valves 180. One of the pressure instruments T is connected into a recorder 184 which monitors and prepares a record (see FIGURE 7) of the pressures applied to instruments 178. The actual pressure vs. time trace made by recorder 184 when monitoring a pressure balance would appear as the trace labeled 186 in FIGURE 7 and would not include the trace labeled 188. Trace 188 is included to show the record which would be obtained when monitoring a pressure balance of the type available heretofore. It will be noted that trace 186 does not overshoot and then fall below (oscillate) each of the pressure levels labeled A and B as does trace 188. It is obvious that the time required to stabilize the pressure balance at each pressure level has been greatly reduced and thus the time required to test a pressure instrument over a range of, for example, 100 pressure levels, is considerably lessened. More significant is the fact that there is no overshoot or oscillation at each pressure level. The characteristic of recording instruments are such (hysteresis for example) that a test may have to be run over if there is any overshoot at any pressure level during the test.

What is claimed is:

1. An apparatus for calibrating pressure instruments comprising:
    (a) a pivotally mounted beam adapted to have a predetermined weight placed on one end thereof and a force applied to the other end thereof that precisely counters the rotational effects of said weight and balances said beam;
    (b) a fluid pressure source;
    (c) pressure actuated means that includes a cylinder connected into said fluid pressure source and positioned adjacent said other end of said beam, a piston and piston rod slidably disposed in said cylinder with said piston rod extending from said cylinder to engage said beam for applying force to the other end of said beam;
    (d) a plurality of valve means that includes slow and fast acting valves connected between said fluid pressure source and said pressure actuated means;
    (e) said plurality of valve means including:
        (1) a first slow valve for slowly increasing the pressure in said cylinder and thus the force exerted by said piston assembly upon said beam;
        (2) a first fast valve for rapidly increasing the pressure in said cylinder and thus the force exerted by said piston assembly upon said beam,
        (3) a second slow valve for slowly venting said cylinder to reduce the force applied by said piston assembly to said beam; and
        (4) a second fast valve for rapidly venting the pressure in said cylinder to reduce the force applied by said piston assembly to said beam;
    (f) electrical switch means positioned adjacent said other end of said beam and operatively associated therewith for sensing the position of said beam and selectively actuating said plurality of valve means to increase and decrease the pressure in said pressure actuated means and thereby change the force applied to said beam;
    (g) means for communicating the pressure in said pressure actuated means to a pressure instrument being calibrated;
    (h) time delay means connected between said electrical switch means and said valve means for delaying the actuation of said valve means to increase the pressure in said pressure actuated means for a predetermined time period immediately after the pressure in said pressure actuated means has been decreased and also for delaying the actuation of said valve means to decrease the pressure in said pressure actuated means for a predetermined time period immediately after the pressure in said pressure actuated means has been increased.

2. The apparatus recited in claim 1 wherein said electrical switch means comprises:
    (a) a first electrical contact plunger adapted to engage one side of the other end of said beam when the other end of said beam is deflected upwardly by a weight applied to the one end thereof, thus completing a circuit that results in actuation of said first slow valve;
    (b) a second electrical contact plunger adapted to be engaged by said first contact plunger to complete a second circuit which results in actuation of said first fast valve;
    (c) a third electrical contact plunger adapted to engage the other side of the other end of said beam when the other end of said beam pivots downwardly due to removing some of the weight applied to the one end of said beam; whereby a third circuit is completed that results in actuation of said second slow valve;
    (d) a fourth electrical contact plunger adapted to be engaged by said third contact plunger to complete a fourth circuit which results in actuation of said second fast valve, said first and second fast valves being actuated only when said beam is deflected to a greater extent than that required to actuate said first and second slow valves.

3. The apparatus recited in claim 2 wherein said time delay means includes:
    (a) a first time delay circuit that is energized when said first slow valve is actuated to admit pressure into said pressure actuated means;

(b) said first time delay circuit including a relay having normally closed contact points that are held open when said circuit is energized and a capacitor that is charged when said circuit is energized, said capacitor discharging through said relay to maintain the contact points open during the period of time required for the capacitor to discharge after the first time delay circuit is de-energized;

(c) said first time delay means being connected into a circuit for actuating said second slow valve whereby this last mentioned circuit is open when the normally closed contact points are open and the second slow valve cannot be actuated.

4. The apparatus recited in claim 3 wherein said time delay means further includes:

(a) a second time delay circuit that is energized when said second slow valve is actuated to vent pressure from said pressure actuated means;

(b) said second time delay circuit including a relay having normally closed contact points that are held open when said circuit is energized and a capacitor that is charged when said circuit is energized, said capacitor discharging through the relay to maintain the contact points open during the period of time required for the capacitor to discharge after the second time delay circuit is de-energized;

(c) said second time delay means being connected into a circuit for actuating said first slow valve, whereby, said first slow valve cannot be actuated as long as the normally closed contact points of said second time delay circuit are held open.

References Cited
UNITED STATES PATENTS

| | | | |
|---|---|---|---|
| 2,747,034 | 5/1956 | Machon et al. | 200—16 |
| 2,893,236 | 7/1959 | Coon et al. | 73—4 |
| 2,909,625 | 10/1959 | Moorman | 200—16 |
| 2,976,715 | 3/1961 | Roese et al. | 73—4 |
| 2,992,302 | 7/1961 | Schuler | 200—81.5 |
| 3,104,540 | 9/1963 | Vitale | 73—4 |
| 3,106,084 | 10/1963 | Hoffman et al. | 73—4 |

LOUIS R. PRINCE, Primary Examiner

J. NOLTON, Assistant Examiner

U.S. Cl. X.R.

200—81.5